Aug. 22, 1961 W. A. CHRISTOPHERSON ET AL 2,997,361

SELECTIVE ELECTROSTATIC CHARACTER PRINTING

Filed June 25, 1958 2 Sheets-Sheet 1

INVENTORS
WARREN A. CHRISTOPHERSON
LLOYD C. TIDBALL
BY
Edward A. Robinson
ATTORNEY Aug. 22, 1961 W. A. CHRISTOPHERSON ET AL 2,997,361

SELECTIVE ELECTROSTATIC CHARACTER PRINTING

Filed June 25, 1958 2 Sheets-Sheet 2

United States Patent Office 2,997,361

Patented Aug. 22, 1961

2,997,361

SELECTIVE ELECTROSTATIC CHARACTER PRINTING

Warren A. Christopherson, Santa Clara County, and Lloyd C. Tidball, Saratoga, Calif., assignors to International Business Machines Corporation, New York, N.Y., a corporation of New York Filed June 25, 1958, Ser. No. 744,571

5 Claims. (Cl. 346—74)

This invention relates to printing apparatus and more particularly to stylus type printers wherein an electric field or electric current flow causes a chemically treated paper to darken and change color beneath selected styli for forming characters.

A stylus printer normally forms characters from a matrix of dots which are produced by passing electric current or impressing an electric field from the styli through the paper. The size of each printed dot is limited substantially to the dimensions of the styli or probes as they engage the paper. Since the styli must be physically separated and electrically isolated from each other, such printing as heretofore practiced produces characters from a series of discontinuous dots with spaces between each adjacent pair of dots.

It is an object of this invention to provide a method and means for forming improved characters from a matrix of printed dots wherein the dots may be enlarged to the point where adjacent dots overlap each other with no space therebetween.

A further object of this invention is to provide an improved printer having a plurality of styli for scanning across a matrix, the styli being arranged in at least two groups or rows separated along a first or X-dimension, the styli of the two groups being offset or staggered along a second or Y-dimension perpendicular to the X-dimension whereby the scanning of the styli of the second group will interlace with the scanning of the styli of the first group to yield a complete and uniform scanning across the matrix.

According to a preferred form of this invention, the styli are held in a printing head and in spaced relation with a paper tape feeding therepast. The styli are arranged in two rows such that three styli are spaced uniformly across a leading row and four styli are spaced uniformly across a lagging row. Printing is accomplished as the tape feeds past the first row of styli and thence past the second row. The characters are formed in a matrix of selectively printed dots which is seven dots high and five dots wide and with a spacing between characters equal to two dots. Dots which lie adjacent to each other in the direction transversely to the tape feed direction are printed at staggered time intervals and by styli which are in different rows and are separated from each other in the direction of the tape feed; therefore, the styli may be enlarged to thereby enlarge the printed dots to the point where the adjacent dots may actually overlap each other.

Other objects of the invention will be pointed out in the following description and claims and illustrated in the accompanying drawings which disclose, by way of example, the principle of the invention and the best mode which has been contemplated of applying that principle.

Figure 1:
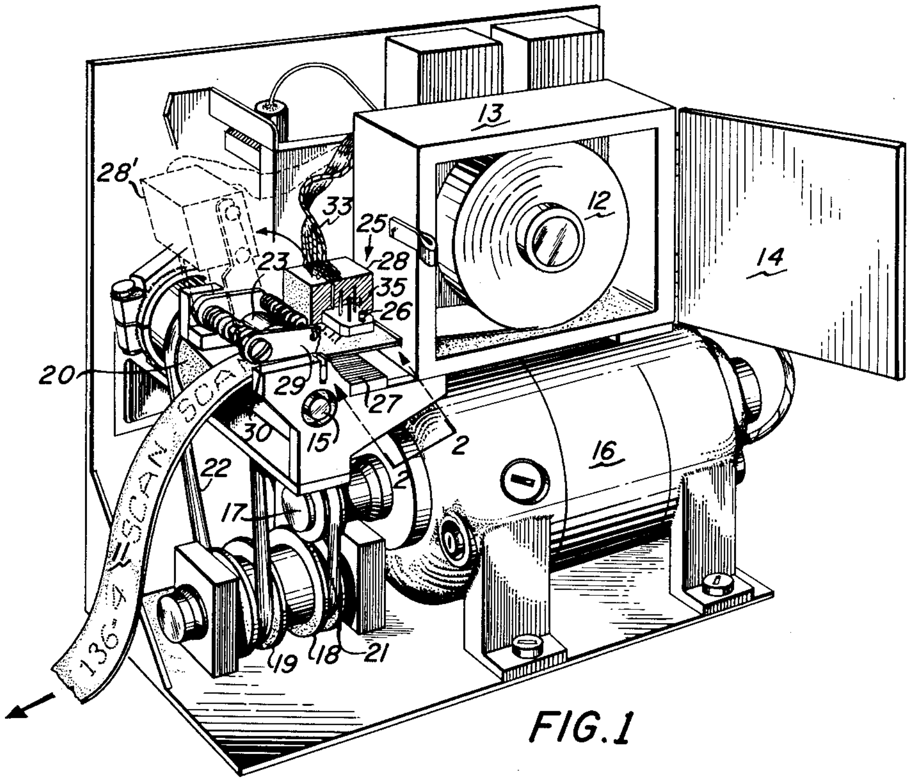
FIG. 1 is a perspective view of a printer constructed according to the teachings of this invention.

As shown in FIG. 1, a tape 11 comprising a narrow strip of chemically treated paper may be initially stored on a reel 12 within a magazine housing 13 shown with a door 14 ajar. The tape may be moved or fed by a feed roller mounted on a shaft 15 and powered by a motor 16 through a belt reduction drive arrangement which includes pulleys 17, 18, 19 and 20 and the belts 21 and 22. An idler roller 23 is positioned to press downwardly and to frictionally engage the tape 11 against the feed roll on the shaft 15.

The tape feeds past a printing point 25 and between a stylus head 26 and a metal printing plate 27. The stylus head 26 may be a pluggable unit which is secured to a pivotal mounting block 28 shown partially broken away in FIG. 1. The mounting block 28 is supported by an arm 29 which is pivoted at 30. To thread the tape 11, the mounting block 28 with the stylus head 26 therein may be pivoted upwardly to rest in a position 28' indicated by dashed lines in FIG. 1.

Figure 2:
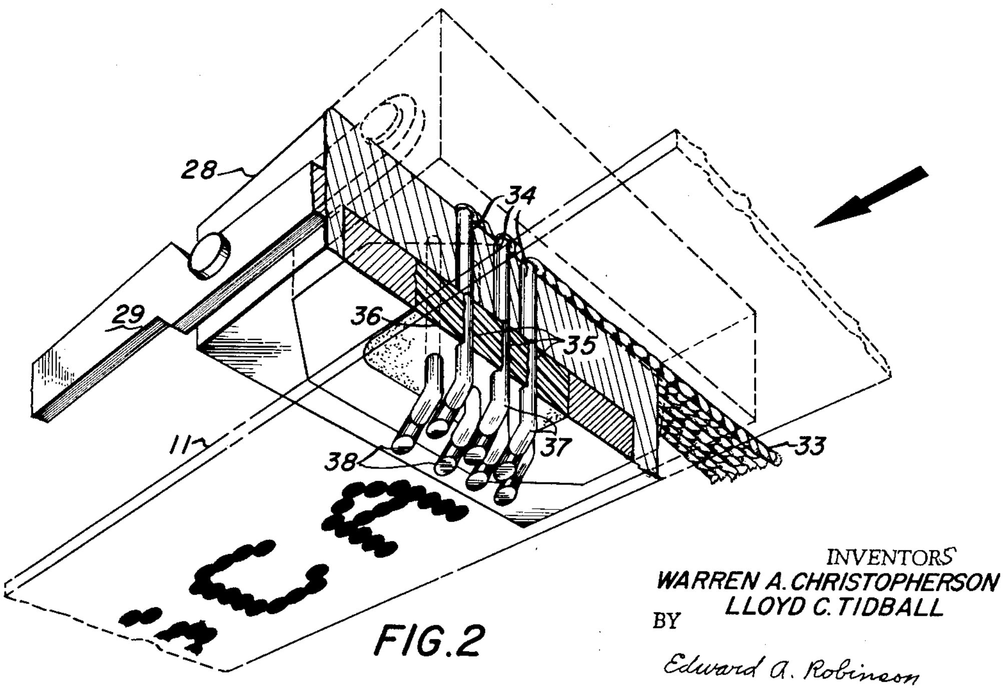
FIG. 2 is an enlarged fragmentary perspective view looking upwardly along the plane 2—2 of FIG. 1, and showing the relation of the styli of this printer to each other and to the tape which is fed thereacross.

The mounting block 28 constitutes a socket into which the stylus head 26 may be plugged and an electrical connection is made between the conductors of a cable 33 and a plurality of conducting sockets 34 which engage and hold upwardly extending ends or prongs of the styli 35 (see FIG. 2). The styli 35 may be molded or potted in a plastic material 36 to form the core or center of the head 26. Each of the styli 35 extends downwardly from the head and is turned rearwardly (with respect to the relative movement of the tape 11) to form approximately a 45° angle at a knee bend 37. The lower extremities of each of the styli 38 is ground flat and formed into an area or spot of desired shape (shown as circular in the drawing) against the tape 11. Thus, it may be appreciated that an electrical circuit is formed through each of the conductors of the cable 33 connecting to a styli thence through an incremental or dot area of the tape 11 and to the backing plate 27. The chemically treated paper of the tape 11 may thus be caused to darken or change color by applying voltages selectively to the styli 35 or causing current flow therethrough.

Figures 3, 4, 5, 6:
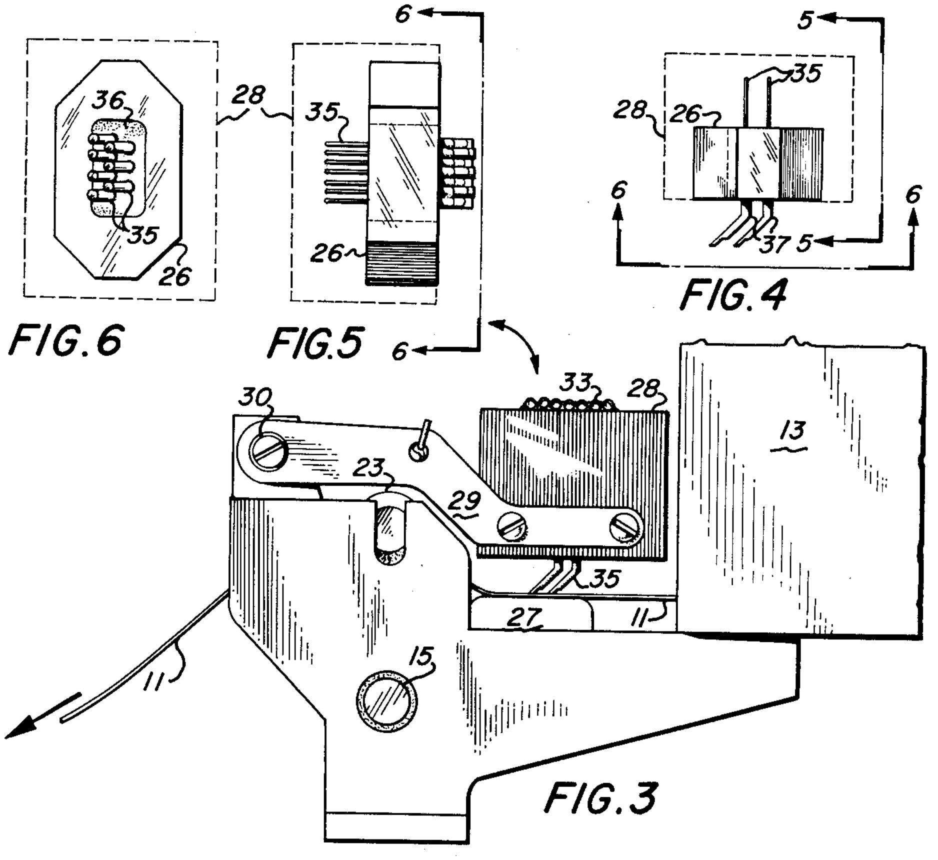
FIG. 3 is front elevation of the stylus printing head together with the apparatus for support thereof.
FIG. 4 is a front elevational view of the printing head as it may be removed from the mounting bracket.
FIG. 5 is a side elevational view looking along the plane 5—5 of FIG. 4.
FIG. 6 is a bottom view looking upwardly along the plane 6—6 of FIGS. 4 and 5.

Since the styli 35 continually bear upon and frictionally engage the moving tape 11, the styli are subject to wear and must be replaced from time to time. Thus, to simplify maintenance pluggable and replaceable heads 26 are formed with the styli therein as specifically illustrated in FIGS. 4, 5 and 6. As shown in FIG. 4, the lower portion of the styli 35 is formed with a knee 37 to engage the tape 11 while the upper portion form prongs for electrical connection into an appropriate socket. FIGS. 4, 5 and 6 illustrate the head 26 at approximately double its actual size and illustrate the manner in which the socket is positioned within the supporting block 28.

Figure 7:
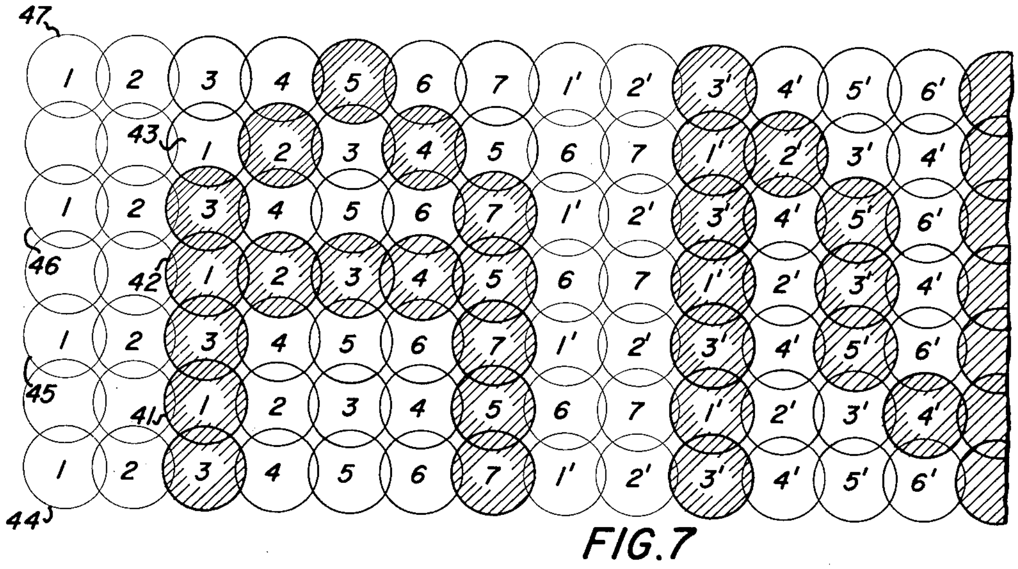
FIG. 7 is an enlarged schematic diagram illustrating the matrix of dots and the sequence of printing the dots of the matrix as the tape or other medium is fed past the printing head.

The styli 35 are arranged in two rows, and considering the transverse or Y-direction across the tape, the individual styli in each row are interlaced with respect to each other such that a complete matrix of seven dots high in the Y-direction is scanned as tape and styli relative to each other. FIG. 7 shows the sequence of printing dots to form the characters "A" and a subsequent character "N." In an initial printing operation of the character "A" the three leading styli are positioned at dots 41, 42, and 43 and the styli at 41 and 42 are caused to become electrically conductive whereupon the dots 41 and 42 are darkened as shown by crosshatching. Simultaneously, the four lagging styli are positioned at 44, 45, 46 and 47. Since the lagging styli are in a space between letters, the electrical circuit is not closed and the dots 44 through 47 are not darkened. It may be appreciated that in the initial printing operation, the seven styli occupy the general positions denoted by the numeral 1 in FIG. 7. In the second printing operation the styli have moved relative to the paper or tape 11 and occupy the dot positions denoted by the numeral 2. Likewise, subsequent printing positions of the seven styli are shown and labeled with the numeral representing the sequence of the printing operation. Thus, each styli moves in an X-direction across the character and selectively prints dots in seven positions. As heretofore described, the three leading styli initiate the character printing operations by printing selected dots while the four lagging styli remain in the spaced position between characters. During the final printing operations for each character, the leading styli moves to dot positions 6 and 7 between the characters while the lagging styli likewise at positions 6 and 7 are continuing to selectively print dots.

To obtain an attractive and easily readable printed copy, it is desirable that adjacent characters be spaced from each other by a dimension equal to two dots, and therefore, the character matrix may be considered to be a seven by seven dot square which includes the intercharacter spacing. By staggering the styli in two rows as taught by this invention, a superior quality of printing may be achieved without sacrificing any matrix space requirement, and without unduly complicating the electric circuitry which must feed an output signal to the printing head. After seven printing operations, as shown in FIG. 7, the character "A" is completed and the printing of the next subsequent character, an "N" is commenced. The dot pattern beyond the first seven is continued by showing the subsequent dots as 1', 2' and 3', etc., which constitutes the printing of the next subsequent character, the "N." It will be appreciated that the timing for forming a particular character consists of only seven intervals for printing selective dots, and that at the end of the seventh dot printing interval, that character is complete, prior to the commencement of the next character. Thus, the timing for forming each character does not overlap or interfere with the timing for forming subsequent characters.

By following the teachings of this invention, wherein styli are arranged in two rows, it is possible to increase the relative size of each styli to the point where the dot pattern overlaps as shown in FIG. 6 and at the same time to provide an electrical isolation between all of the styli in the configuration. Thus, in the initial printing step, the styli occupying the positions 41 through 47 remain separated from each other. The dots thus produced will overlap to produce heavier and more easily readable characters, than could be produced by matrix printing methods as heretofore practiced.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention therefore, to be limited only as indicated by the scope of the following claims.

What is claimed is:

1. For use in a stylus printing apparatus including means for moving a chemically treated tape past a printing station, and support means for holding a stylus head in continuous contact with the moving tape, a stylus head for printing continuous lines axially and transversely of the tape, said head including a plurality of spaced styli positioned in two parallel rows with the styli of one row interspersed between those of the other row, the spacing between the rows and between the styli of each row being uniform and less than the width of a stylus, and electrical means connected to each stylus to selectively energize styli of each row, the electrical means being synchronized with the means for moving the tape to print successive dots at intervals corresponding to the spacing between rows so that adjacent printed dots will overlap to form continuous lines on the moving tape.

2. For use in a stylus printing apparatus, a stylus head for printing continuous lines axially and transversely of a chemically treated moving tape, said head including a plurality of styli spaced in two parallel rows transversely of the tape with the styli of one row interspersed between those of the other row, the spacing between the rows and between the styli of each row being uniform and less than the width of a stylus, and electrical means connected to each stylus to selectively energize styli of each row to print successive dots at intervals corresponding to the spacing between rows so that adjacent printed dots will overlap to form continuous lines on the moving tape.

3. Apparatus for printing continuous lines on a chemically treated moving tape along the co-ordinates in a rectangular matrix by printing dots in the co-ordinate intersections of the matrix, the apparatus including a plurality of styli uniformly spaced in two rows across the matrix, the spacing between the rows and between the styli of each row being uniform and less than the width of a stylus, and electrical means connected to each stylus to selectively energize styli of each row to print successive dots at intervals corresponding to the spacing between rows so that adjacent printed dots will overlap to form continuous lines on the moving tape.

4. Apparatus for printing continuous lines on a chemically treated moving tape along the co-ordinates in a rectangular matrix by printing dots in the co-ordinate intersections of the matrix, the matrix extending for seven intersections uniformly spaced along a Y-direction and for five intersections uniformly spaced along an X-direction, the apparatus including seven styli arranged in two rows extending across the matrix in the Y-direction, one of said rows having four styli spaced uniformly two intersections apart, the other row having three styli spaced uniformly two intersections apart and interspersed with the styli of the first row, said rows being spaced two intersections apart along the X-direction, and electrical means connected to each stylus to selectively energize styli of each row to print successive dots at intervals corresponding to the spacing between rows so that adjacent printed dots will overlap to form continuous lines on the moving tape.

5. Apparatus for forming characters on a chemically treated tape, said apparatus comprising: means for moving the tape past a printing station; a printing head for printing continuous lines axially and transversely of the tape; and pivotal support means for holding the printing head at the printing station; said printing head having a plurality of styli extending therefrom and contacting the tape at the printing station, said styli being arranged in two rows extending transversely of the tape and spaced longitudinally thereof, the styli of one row being interspersed between those of the other row, the spacing between the rows and between the styli of each row being uniform and less than the width of a stylus, and electrical means connected to each stylus to selectively energize styli of each row, the electrical means being synchronized with the means for moving the tape to print successive dots at intervals corresponding to the spacing between the rows so that adjacent printed dots will overlap to form continuous lines on the moving tape.

References Cited in the file of this patent

UNITED STATES PATENTS

| | | |
|---|---|---|
| 2,015,570 | Sabbah et al. | Sept. 24, 1935 |
| 2,035,474 | Hay | Mar. 31, 1936 |
| 2,035,475 | Hay | Mar. 31, 1936 |
| 2,486,985 | Rendefer | Nov. 1, 1949 |
| 2,716,826 | Huebner | Sept. 6, 1955 |
| 2,789,027 | Miller | Apr. 16, 1957 |

UNITED STATES PATENT OFFICE

CERTIFICATE OF CORRECTION

Patent No. 2,997,361 August 22, 1961

Warren A. Christopherson et al.

It is hereby certified that error appears in the above numbered patent requiring correction and that the said Letters Patent should read as corrected below.

Column 3, line 11, after "styli" insert -- move --.

Signed and sealed this 9th day of January 1962.

(SEAL)
Attest:

ERNEST W. SWIDER
Attesting Officer

DAVID L. LADD
Commissioner of Patents